(12) United States Patent
Korcz et al.

(10) Patent No.: US 8,633,404 B2
(45) Date of Patent: Jan. 21, 2014

(54) GANGABLE NAIL PLATE

(75) Inventors: Krzysztof W. Korcz, Granger, IN (US); Mahran H. Ayrton, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 295 days.

(21) Appl. No.: 12/713,393

(22) Filed: Feb. 26, 2010

(65) Prior Publication Data

US 2011/0209912 A1 Sep. 1, 2011

(51) Int. Cl.
*H02G 3/34* (2006.01)

(52) U.S. Cl.
USPC ............ 174/507; 174/48; 174/52; 174/53; 174/54; 174/55; 174/56; 174/135; 52/317; 52/506.1; 248/71

(58) Field of Classification Search
USPC ............ 174/48, 135, 507, 53–56; 52/317, 52/506.1; 248/71
See application file for complete search history.

(56) References Cited

U.S. PATENT DOCUMENTS

| | | | | |
|---|---|---|---|---|
| 2,277,758 A | * | 3/1942 | Hawkins | 52/98 |
| 2,317,825 A | * | 4/1943 | Teas, Sr. | 248/71 |
| 3,211,824 A | * | 10/1965 | Heiman | 174/507 |
| 3,211,825 A | | 10/1965 | Clos | |
| 3,240,869 A | | 3/1966 | Jureit | |
| 3,297,815 A | | 1/1967 | Drettmann | |
| 3,350,501 A | | 10/1967 | Jureit | |
| 3,553,346 A | | 1/1971 | Ballantyne | |
| 4,050,205 A | | 9/1977 | Ligda | |
| 4,272,938 A | * | 6/1981 | Seipos | 52/509 |
| D264,683 S | | 6/1982 | Searer | |
| 4,807,417 A | * | 2/1989 | Bell | 52/699 |
| 4,845,913 A | * | 7/1989 | Bell | 52/699 |
| 4,924,646 A | | 5/1990 | Marquardt | |
| 5,163,254 A | | 11/1992 | Zastrow et al. | |
| 6,061,910 A | | 5/2000 | Williamson | |
| 6,642,445 B1 | | 11/2003 | Lalancette | |
| 6,935,079 B1 | | 8/2005 | Julian et al. | |
| 2003/0126824 A1 | | 7/2003 | Jensen | |
| 2009/0020329 A1 | * | 1/2009 | Frenkel | 174/507 |

* cited by examiner

*Primary Examiner* — Hoa C Nguyen
*Assistant Examiner* — James Wu
(74) *Attorney, Agent, or Firm* — Garrett V. Davis; Mark S. Bicks; Alfred N. Goodman

(57) ABSTRACT

A nail plate is attached to the outer surface of a wall stud to protect a utility from penetration by nails or other fasteners driven through a wall surface. The nail plate has a substantially rectangular shape with a width corresponding to the width of the stud. The nail plate has a first and second longitudinal ends with nail tabs for attaching the nail plate to the stud. The ends of the nail plate have at least one recess and at least one protruding portion where the protruding portion can mate with a recess of an adjacent nail plate is ganged together. The nail plates can have coupling members to couple a plurality of nail plates in series in an end to end fashion. The longitudinal ends of the nail plate enable the ends to abut each other with no open portions that can allow a fastener to pass though. In one embodiment the nail tabs extend in a longitudinal direction with respect to a longitudinal dimension of the nail plate. In another embodiment the nail tabs extend in a transverse direction with respect to the longitudinal dimension of the nail plate.

18 Claims, 6 Drawing Sheets

GANGABLE NAIL PLATE

FIELD OF THE INVENTION

The present invention is directed to a system and to a nail plate for mounting to a support such as a wall stud to prevent fasteners or other objects from passing through a wall and striking a utility such as electrical wiring or communication cable. The invention is particularly directed to a gangable nail plate having integrally formed fasteners for attaching to the surface of the wall stud.

BACKGROUND OF THE INVENTION

Utility protector plates are known for use in protecting devices such a wires or cable hidden from view in walls and behind the wall surface. The protector plates are commonly used to prevent damage to wiring, plumbing and other devices from objects passing through the wall such as nails, screws or other fasteners. Wall surfaces mounted onto wall studs or other support structures hide the utility from view and can be difficult to locate once covered thereby creating a risk of penetration resulting in damage and potential injury to the worker.

One example of a protector plate includes a flat strip of metal having one or more prongs extending from the strip. The prongs on the strip are designed to be hammered into the wall stud to attach the strip to the stud. The wall surface is then applied over the strip. The prongs are commonly punched from the strip of metal which can result in holes or open areas that can allow a fastener to inadvertently pass through or between adjacent plates and increase the risk of the fastener contacting the utility wire or cable. One example of this type of protector is disclosed in U.S. Pat. No. 3,240,869 to Jureit. The plate disclosed in this patent has four prongs stamped from the metal plate which results in four opening in the plate for the potential risk of a fastener easily passing through the plate.

Another example of a protector device is disclosed in U.S. Pat. No. 6,642,445 to Lalancette. The device disclosed in this patent is designed to be attached to a furring strip during construction. The protector has a front panel with a flange secured thereto with prongs, tabs or saw teeth extending from the flange. The prongs are constructed to attach the protector to the side of the furring strip.

Another example of a protector device is disclosed in U.S. Patent Publication No. 2009/090329 to Frenkel. This device is constructed to span the distance between two adjacent studs. The device includes L-shaped clips to attach the plates to the wall studs.

Protectors are also used in connection with metal studs. These devices generally require a different means for attaching the protector to the stud from those commonly used for wood studs. One example is disclosed in U.S. Pat. No. 6,935,079 to Julian et al. The device includes rigid flanges that can be coupled to the stud. One flange has a U-shape that is hooked around one side of the stud. Another flange is then bent around opposite side of the stud to secure the protector to the stud.

Another type of protector includes a U-shaped device that encircles the wiring or cable that is then placed within a recess cut into the outer surface of the wall stud. These devices often include a barb or tab that is secured to the recessed area of the wall stud. The protectors require a recess be cut in the wall stud to receive the protector. Examples of this type of device are disclosed in U.S. Pat. No. 3,350,501 to Jureit, U.S. Pat. No. 3,297,815 to Drettmann, U.S. Pat. No. 4,924,646 to Marquadt, U.S. Pat. No. 4,807,417 to Bell, and U.S. Pat. No. 3,553,346 to Ballentyne.

While these devices have been generally useful the intended purpose, there is a continuing need in the industry for improved protectors for attaching to a stud.

SUMMARY OF THE INVENTION

The present invention is directed to a protector for attaching to the surface of a wall stud to prevent fasteners from damaging a utility within the wall. The invention is particularly directed to a nail plate protector plate that can be attached directly to the outer surface of the wall stud.

The nail plate protector of the invention has a shape and dimension to be attached directly to the outer surface of a wall stud without interfering with the attachment of a wall surface. The nail plate of the invention is constructed so that a plurality of plates can be ganged together to extend along the length of the wall stud as needed thereby providing a variable length to cover and protect one or more utility devices supported within the wall. Examples of utilities that can be contained within the wall include for example electrical wires, communication cables, conduits, telephone wires and the like.

One aspect of the invention is to provide a nail plate that is simple to manufacture and simple to install by the worker with limited tools and minimal effort. The nail plate of the invention can be positioned in any desired location along the longitudinal length of the stud and will remain in place while the wall surface is applied over the wall stud.

Another aspect of the invention is to provide a nail plate protector that can be attached directly to the outer surface of a wall stud and covered by a wall surface without interfering with the application of the wall surface.

The nail plate of the invention is made from metal and has a thickness to prevent nails, screws or other fasteners from penetrating thereby preventing damage to the utility supported within the wall. The thickness of the nail plate prevents damage to the utility within the wall without forming bulges or other imperfections in the wall surface.

A further aspect of the invention is directed to a system for protecting utilities within a wall by providing a plurality of nail plates that are attached to a wall stud where the nail plates have ends that mate with each other to form a continuous nail plate of variable length. Two or more nail plates can attached in series or ganged together to form a continuous nail plate having a length necessary to protect the utilities. The nail plates are identical and have mating ends that cooperate with an adjacent nail plate to form a protecting nail plate of a suitable length with no openings or gaps that can inadvertently allow a nail or other fastener to pass through and damage the utility. Each end of the nail plate has at least one recess and at least one protruding portion or tab that is able to mate with the recess of the adjacent nail plate.

The nail plate of the invention generally has width corresponding to a standard width of a conventional wall stud and length sufficient to cover an electrical wire or communication cable extending through a wall.

These and other aspects of the invention are basically attained by providing a nail plate comprising a substantially flat planar body member having a thickness to resist penetration by a fastener. The body has a substantially rectangular shape with a pair of longitudinal side edges and a pair of end edges that extend transverse to the longitudinal side edges. Each of the end edges has a nail tab oriented for mating with a corresponding nail plate in an end-to-end configuration.

The various aspects of the invention are further attained by providing a nail plate for protecting a utility within a wall stud where the nail plate has a thickness to prevent penetration by a fastener. The nail plate comprises a body having a substantially rectangular configuration with first and second longitudinal side edges and first and second transverse ends. A first nail tab is formed at the first transverse end and extends from the first side edge and a second nail tab at the second transverse end and extends from said first side edge toward the second side edge. The first and second nail tabs are oriented to mate with an adjacent nail plate when positioned end-to-end.

The aspects of the invention are also attained by providing a nail plate for protecting a utility in a wall stud. The nail plate has a thickness to prevent penetration by a fastener. The nail plate comprises a body having a substantially rectangular shape with first and second longitudinal side edges and first and second transverse ends. A first nail tab extends from the first transverse end and a second nail tab extends from the second transverse end in a direction opposite to the first nail tab. The first end has a first recess and the second end has a coupling tab for mating with a first end of an adjacent nail plate for coupling a plurality of nail plates together.

The nail plate of the invention provides a system for protecting utilities within a wall by providing a plurality of nail plates that can be attached to the outer surface of a wall stud before the wall surface is attached to the wall stud. The nail plates are identical and can be attached adjacent one another in a contiguous manner for form a continuous nail plate of indeterminate length. The nail plates have nailing tabs at the longitudinal ends of the plate so that the nail tabs are at the mating ends when mounted in series. The nail tabs and the ends of the nail plates are constructed to enable contiguous nail plates to abut each other without openings between them which can allow a fastener to pass between the plates.

These and other aspects of the invention will become apparent from the following detailed description of the invention and the annexed drawings which disclose various embodiments of the invention.

BRIEF DESCRIPTION OF THE DRAWINGS

The following is a brief description of the drawings in which.

DETAILED DESCRIPTION OF THE INVENTION

Figure 1:
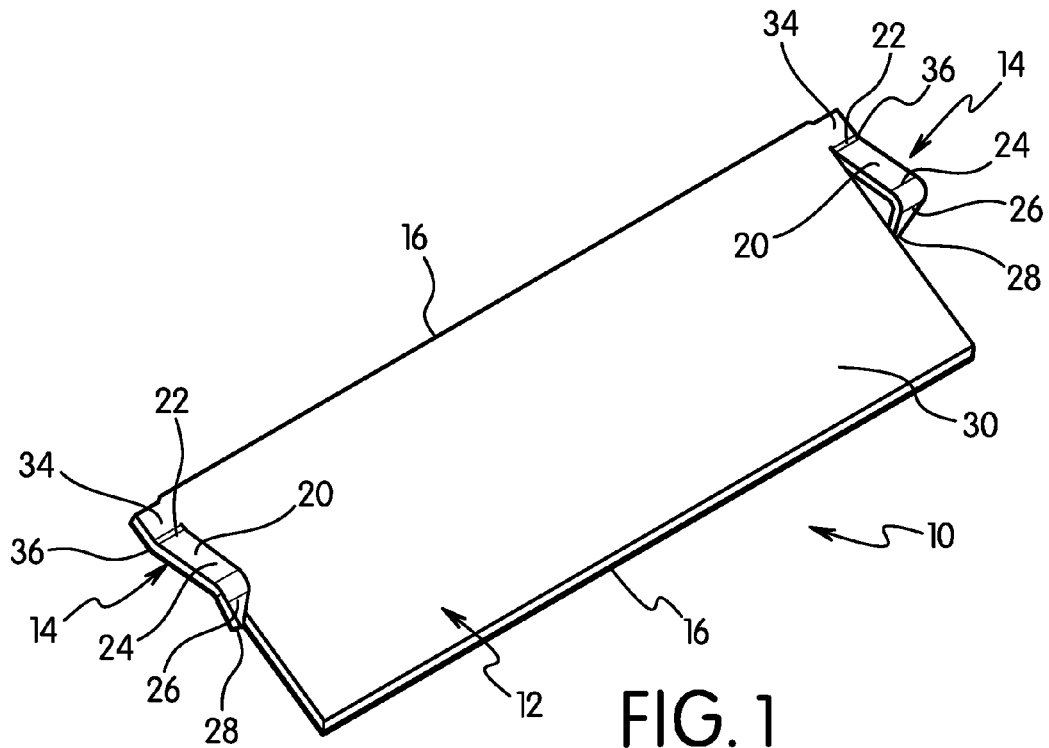
FIG. 1 is a perspective view of a nail plate in a first embodiment of the invention.
Figure 2:
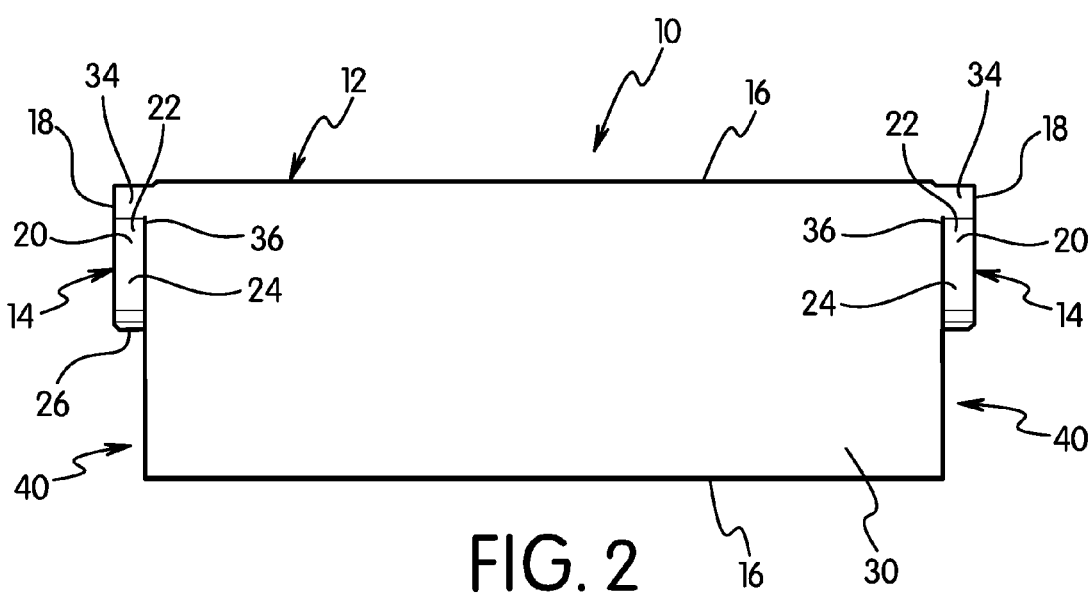
FIG. 2 is a top view of the nail plate of FIG. 1.

The present invention is directed to a nail plate that can be attached to a wall stud to protect wiring, conduits, connectors, cables, telephone wires and other utilities from damage by objects or fasteners penetrating the wall. The invention is particularly directed to a nail plate protector that can be ganged together and attached to a wall stud during construction and mounted beneath the wall surface without interfering with the construction of the wall surface. The nail plate protector has ends with at least one protruding portion and at least one recessed portion. The protruding portion has a shape and dimension to mate with the recessed portion so that adjacent nail plates can be ganged together.

The nail plate of the invention can be ganged together so that two or more nail plates can be contiguous to provide a length sufficient to protect objects below the wall surface. The nail plate is typically made of steel or other materials that provide sufficient strength to prevent or inhibit penetration by objects such as nails or other fasteners that can damage the objects beneath the wall surface and prevent injury by inadvertently damaging electrical wiring.

Referring to the drawings, the invention in one embedment is a nail plate 10 having a body 12 and at least one nail tab 14 integrally formed with the body. The body 12 in one embedment has a substantially rectangular shape with a width corresponding to the width of a standard building wall stud which is typically about 3½ to 3¾ inches. The body 12 has a length that is sufficient to overlie a standard electrical wire, communication cable, pipe or other object within a wall stud. In one embodiment of the invention, the body 12 has a length of about 6 inches although the length and width can vary depending on the intended use and the objects to be protected.

As shown in FIGS. 1-4, body 12 of nail plate 10 has a substantially rectangular shape with longitudinal sides 16 that are parallel to each other and extend the length of the body 12. Body 12 has longitudinal end edges 18 extending transverse to the longitudinal sides 16. Preferably, the longitudinal sides 16 are continuous with no cuts or openings so that body 12 can overlie the wall stud without openings in the body which can otherwise allow a fastener or other object to pass through and inadvertently damage an object within the wall. In one embodiment, body 12 has a width so that the longitudinal sides 16 are aligned with side edges of the wall stud when installed on the wall stud. In other embodiments, the body 12 can have a width greater than the width of the wall stud to provide additional protection of the objects within the wall.

In the embodiment of FIGS. 1-7, body 12 includes at least one nail tab 14 at each longitudinal end 18. The nail tabs 14 are preferably identical and are oriented to enable two or more nail plates 10 to be ganged together in an end to end fashion so that the ganged nail plates extend along the length of the wall stud a suitable distance to protect the objects within the wall. As shown in FIG. 1, the nail tabs 14 are integrally formed with the body 12 and extend in a direction transverse to the longitudinal dimension of the body 12.

Each nail tab 14 has leg 20 with a first end 22 coupled to and extending from body 12 and an opposite second end 24 spaced from the first leg 20. Each leg 20 has a nailing prong 26 with a first end coupled to the second end 24 of leg 20 and a distal pointed end 28. The distal end 28 terminates at a point to enable the prong 26 to be nailed into a wall stud by hammering. Nailing prong 26 is oriented at an angle with respect to the respective leg 20 for nailing into a wall stud.

Figure 3:
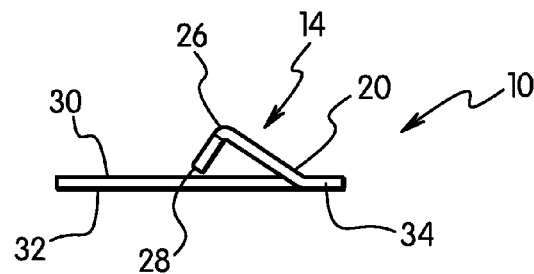
FIG. 3 is an end view of the nail plate of FIG. 1.
Figure 4:
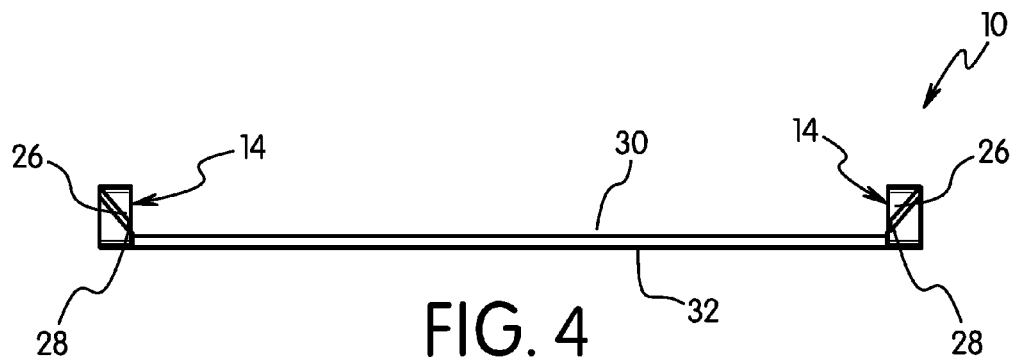
FIG. 4 is a side view of the nail plate of FIG. 1.

As shown in FIG. 3, the leg 20 of nail tab 14 is formed at an inclined angle with respect to the plane of the body 12 and extends upwardly with respect to a top face 30 of body 12. The prong 26 is formed at angle with respect to the plane of leg 20 and extends in a downward direction toward a bottom face 32 of body 12. In one embodiment, prong 26 is oriented to extend at an angle with respect to the plane of body 12 to be nailed into the wall stud perpendicular to the surface of the wall stud to which the nail plate is to be attached.

In the embodiment of FIGS. 1-7, nail tabs 14 are oriented to extend inwardly from a side edge 16 toward the opposite side edge. The leg 20 is spaced inwardly from the side edge 16 a distance to provide sufficient strength to the end portion 34 of body 12 to prevent separation during use. The leg 20 of nail tab 14 is coupled to the end portion 34 by a fold line 36 to enable the prong 26 to penetrate the wall stud. The leg 20 and prong 26 are bent to form nail tab 14 and a notch or recessed portion 40 having a dimension corresponding to the dimension of the nail tab 14. The nail tab 14 and the end portion 34 form a protruding portion that has a size and dimension to mate with a received portion 40 of an adjacent nail plate.

Figure 5:
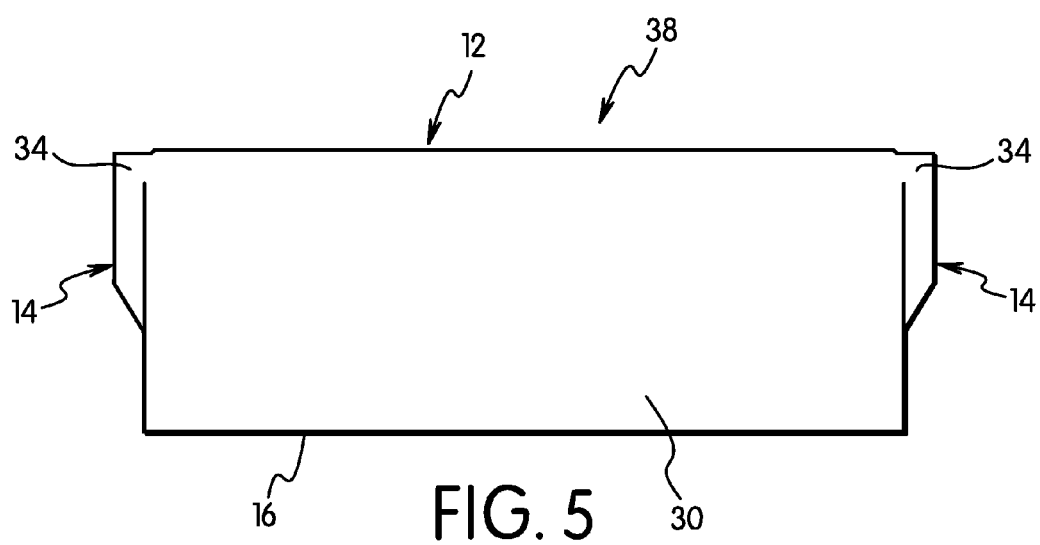
FIG. 5 is a top view of the blank for forming the nail plate of FIG. 1.

FIG. 5 is a top view of the cut blank 38 used to form the nail plate 10. The leg 20 and the prong 26 in the embodiment shown in FIG. 5 have a combined length substantially equal to the width of the blank to minimize waste. As shown, leg 20 has a length such that the second end 24 of leg 20 terminates at about the mid point of the bank 38. The nail prong 26 in this embodiment has a length substantially equal to about one half of the width of the blank 38.

Figure 6:
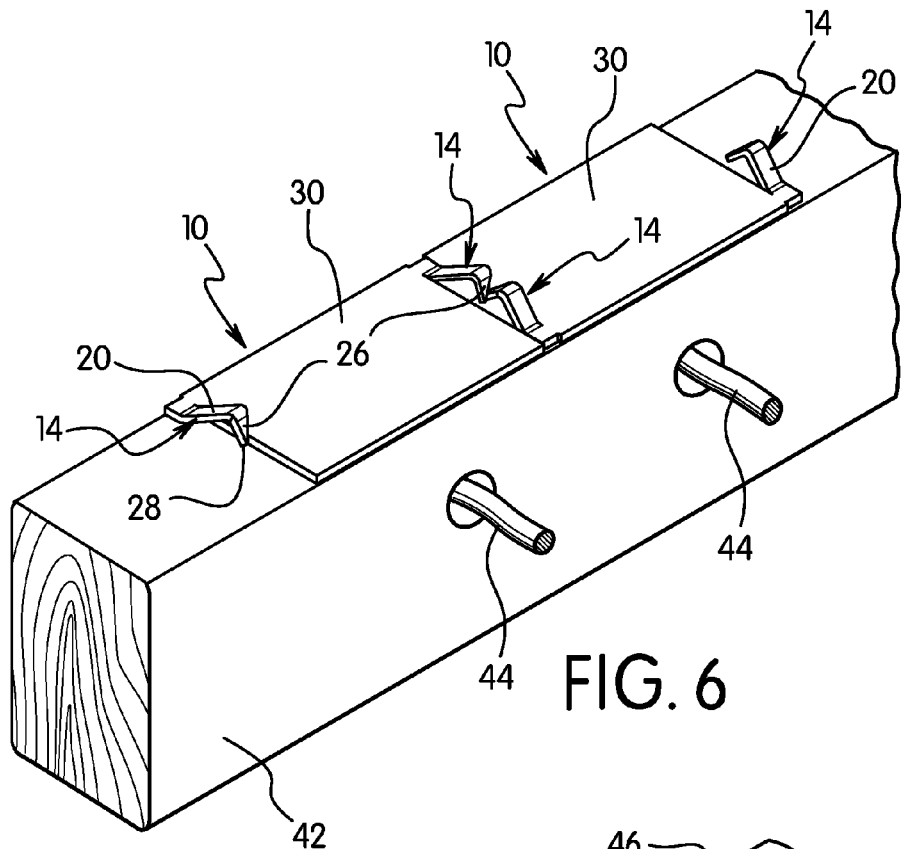
FIG. 6 is a perspective view of two nail plates ganged together on a wall stud.
Figure 7:
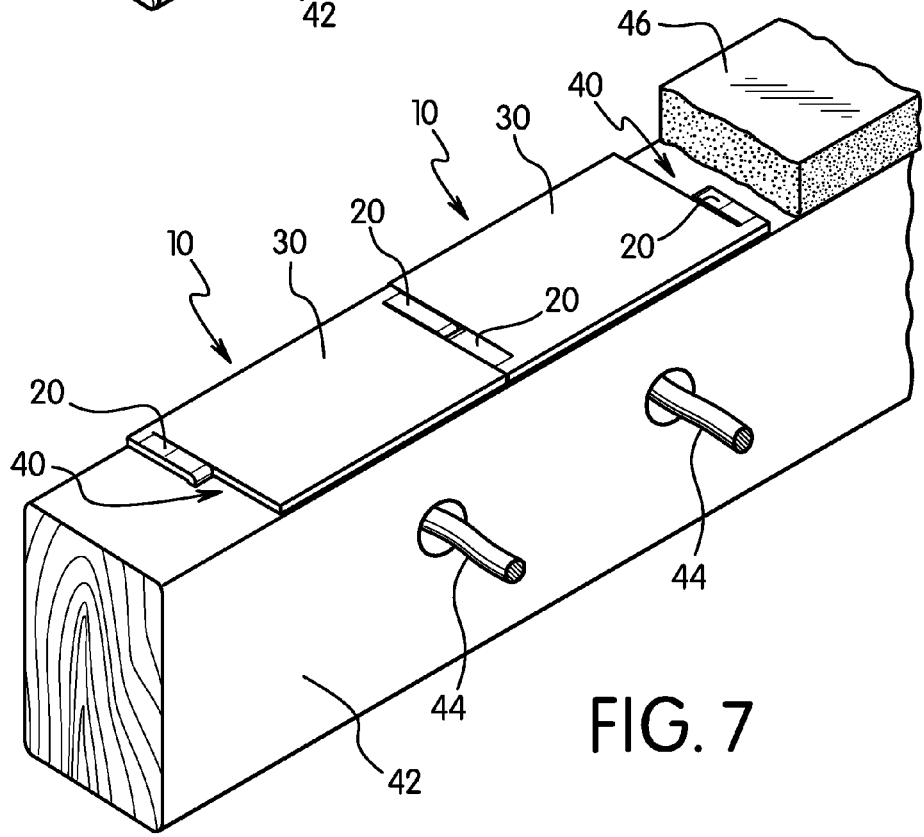
FIG. 7 is a perspective view of the ganged nail plates of FIG. 6 showing the nailing tabs embedded into the wall stud.

Referring to FIGS. 6 and 7, one or more nail plates 10 are positioned on a wall stud 42 in the desired location overlying an object, such as electrical wiring 44, within the wall stud 42. The nail plates 10 can be ganged together as shown to provide a length suitable for protecting the wiring. The nailing tabs 14 are positioned to enable one end of the adjacent nail plates 10 to abut the adjacent nail plate with the nail tabs 14 facing each other and the nail tab of one nail plate mating with the recessed portion of the other nail plate.

The nail tabs 14 have a dimension so that the ends 22 of the legs 20 are contiguous to form a continuous protective plate. In one embodiment, legs 20 of the nail tabs 14 have a length so that the ends of the legs extend about one half the width of the nail plate. The recessed portion 40 has a dimension to mate with the nail tab 14 of the contiguous nail plate 10 to eliminate openings between the nail plates 10. As shown in FIG. 7, nail plates 10 are positioned in the desired location and the prongs 26 are hammered downwardly so that the nail prongs 26 penetrate the wall stud. In the embodiment shown, the wall studs 42 are wood although the nail plates 10 of the invention are suitable for other stud materials. After the nail plates 10 are attached to the wall stud 42 a suitable wall surface 46 can be applied over the wall studs.

In a second embodiment of the invention shown in FIGS. 8-14, a nail plate 50 includes a body 52 and nail tabs 54. Body 52 has a substantially rectangular configuration with sides 56 extending in a longitudinal direction and defining a longitudinal dimension of the body and longitudinal ends 58 and 60 extending transverse to the longitudinal dimension of the body 52. As in the previous embodiment the sides 56 are straight and continuous.

The ends 58 and 60 have a shape to mate with each other to couple or gang two or more nail plates together when it is desirable to gang more than one nail plate together. In the embodiment shown, the ends have an interlocking dovetail shape formed by at least one protruding portion and at least one recessed portion in each end. The first end 58 has a dovetail 62 formed by a first tab portion 64 and second tab portion 66 which define triangular shaped recesses 68 and 70, respectively.

Figure 9:
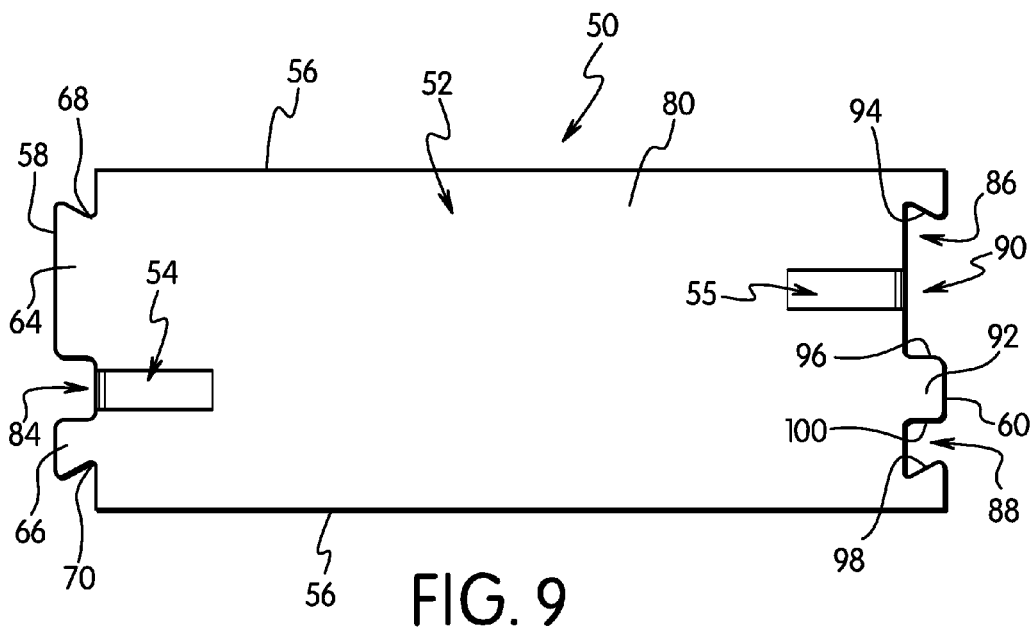
FIG. 9 is top view of the nail plate of FIG. 8.
Figure 10:
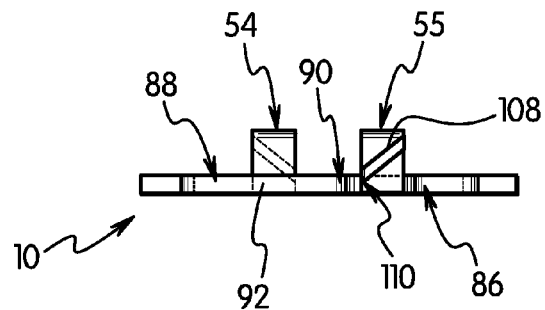
FIG. 10 is an end view of the nail plate of FIG. 8.

The nail tabs 54 in the embodiment shown have a longitudinal dimension extending in a longitudinal direction of the body 52 and extend outwardly with respect to the ends 58 and 60 of the body 52. A first nail tab 54 is formed at the first end 58 of body 52 and a second nail tab 55 is formed at the second end 60. As shown in FIG. 9 the nail tabs 54 and 55 are offset with respect to each other in the longitudinal dimension of the body 52 of the nail plate 50.

Figure 8:
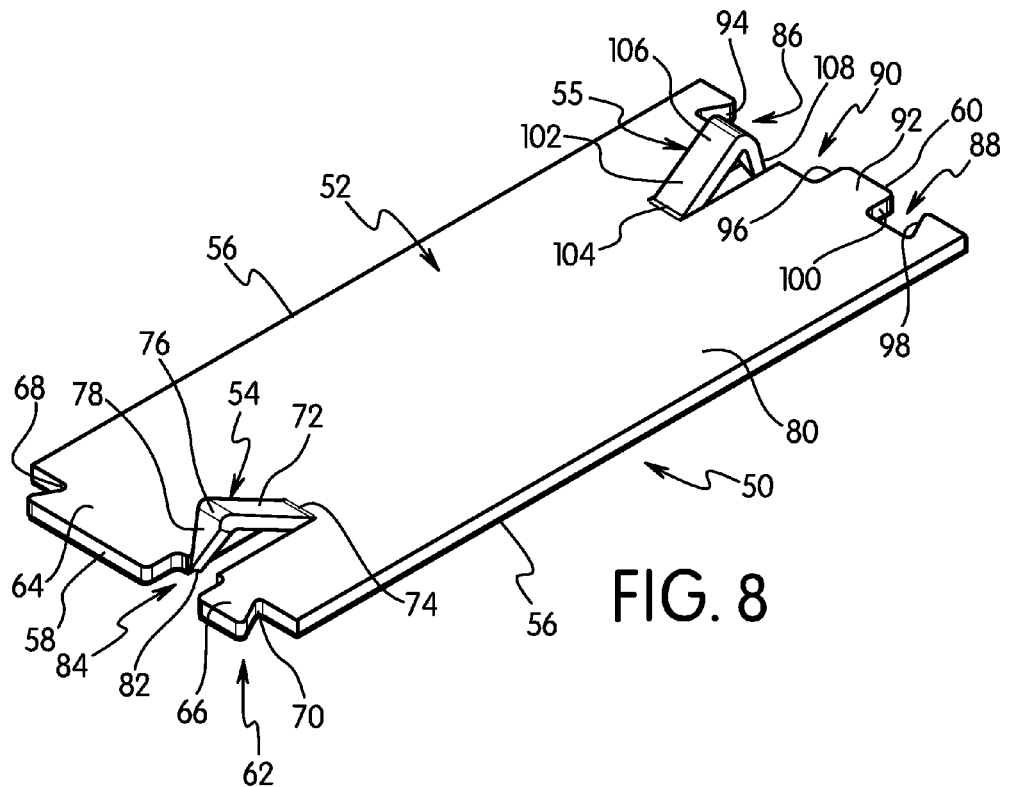
FIG. 8 is a perspective view of the nail plate in a second embodiment of the invention.
Figure 11:
FIG. 11 is side view of the nail plate of FIG. 8.
Figure 12:
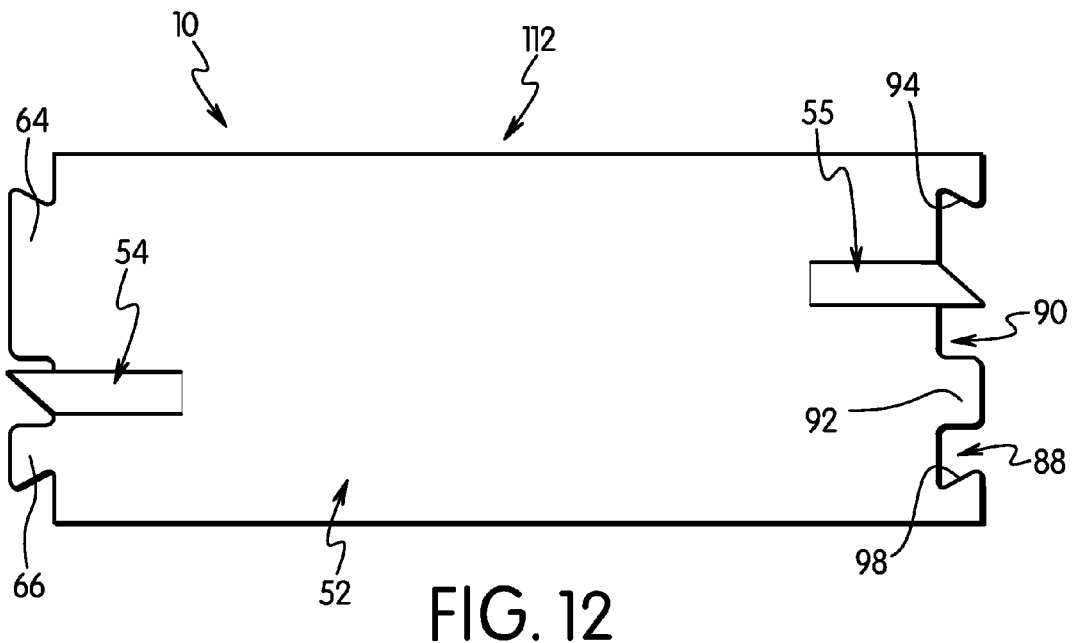
FIG. 12 is a top view of the blank for forming the nail plate of FIG. 8.

Nail tab 54 is integrally formed with the body 52 and includes a leg 72 having a first end 74 coupled to the body 52 and second end 76. A prong 78 extends from the second end 76 for nailing into the wall stud. As shown in FIGS. 8 and 11, leg 72 extends at an inclined angle with respect to the body 52 in an upward direction from a top face 80 of the body 52 and toward the first end 58. Prong 82 terminates at a pointed end 82. As shown in FIG. 8, prong 78 is cut from the dovetail 62 and is off center from a center axis of the body 52. Dovetail 62 has a recessed portion 84 aligned with the nail tab 54 to define the first portion 64 and second portion 66 of dovetail 62 as shown in FIG. 9.

Figure 13:
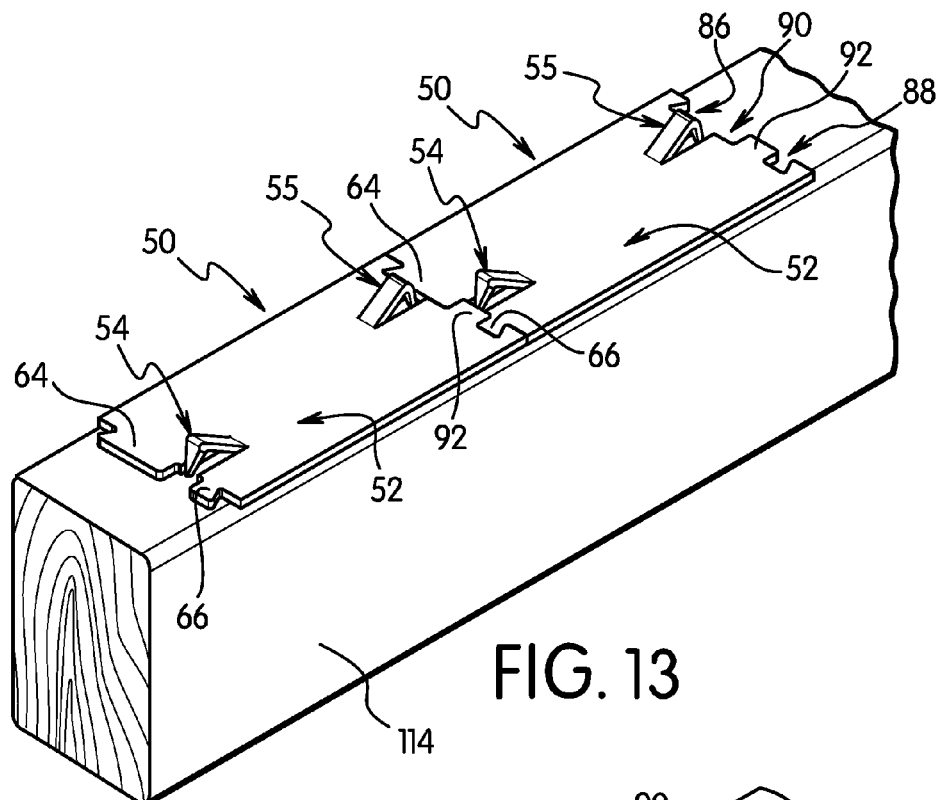
FIG. 13 is a perspective view of two nail plates of FIG. 8 ganged together on a wall stud before attaching the nailing tabs.

The second end 60 of body 52 has a shape and dimension complementing the shape and dimension of the first end 58. As shown in FIG. 7, the second end 60 has a first recessed portion 86 and a second recessed portion 88 forming a dovetail shaped recess 90 corresponding to the dovetail 62. First recessed portion 86 and second recessed portion 88 are spaced apart a distance to form a tab 92. Tab 92 has a width and length corresponding to the width and length of recess 84. As shown in FIGS. 9 and 13 tab 92 and recess 84 are aligned so that one or more nail plates can be ganged together with the tab 92 of one nail plate being received in the recess 84 of the adjacent nail plate. First recessed portion 86 has an angled outer side edge 94 and a straight inner side edge 96 defined by tab 92. Second recessed portion 88 also has an angled outer side edge 98 and a straight side edge 100 defined by tab 92. First recessed portion 86 has shape corresponding to first tab portion 64 and second recessed portion 88 has a shape corresponding to the second tab portion 66.

The second nail tab 55 extends in the longitudinal dimension of the body 52 and is aligned with the first recessed portion 86. Tab 55 has a leg 102 with a first end 104 cut from and formed with the body 52 and a second end 106. A nailing prong 108 is formed at the end 106 of leg 102 which terminates a pointed end 110. Leg 102 is cut from the body 52 as shown in the blank 112 of FIG. 12 and bent at an incline with respect to the plane of body 52. Prong 108 is bent to extend substantially perpendicular to the plane of body 52.

Figure 14:
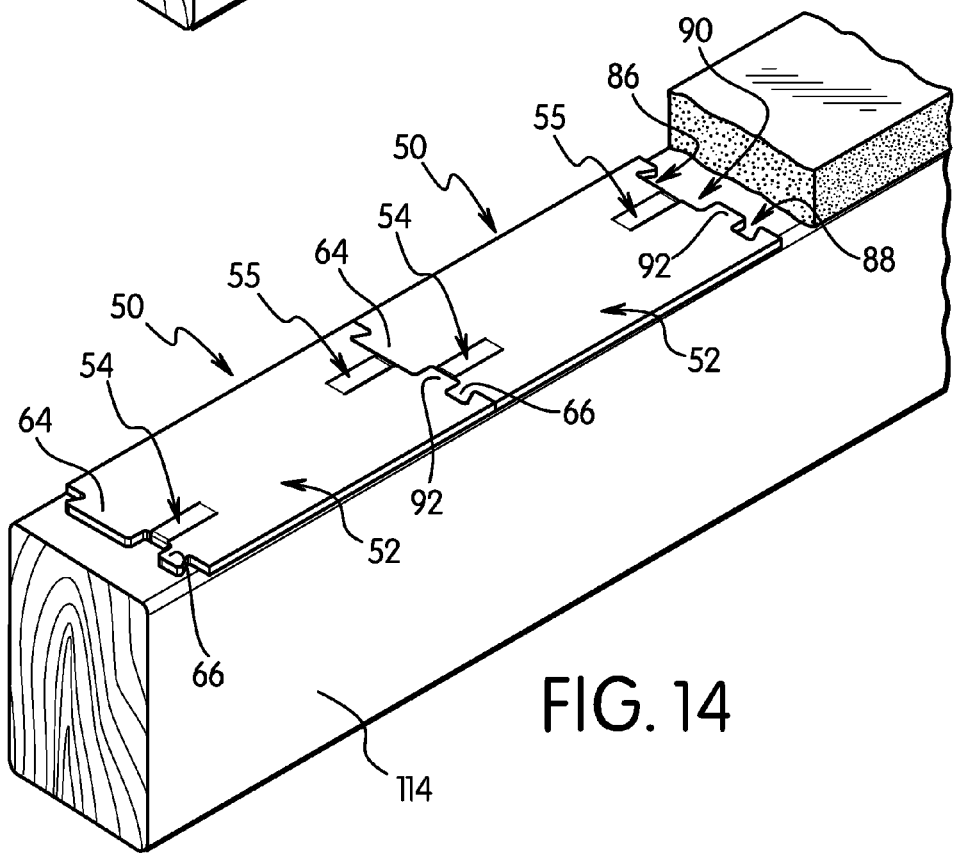
FIG. 14 is perspective view of the two nail plates ganged together showing the nailing tabs attached to the wall stud.

Nail plate 50 can be ganged together in series with a plurality of identical nail plates as shown in FIGS. 13 and 14. The dovetailed ends mate with each other to couple the contiguous nail plates together. The nail plates are positioned on the wall stud 114 as shown in FIG. 13 and the nailing tabs 54 and 55 are hammered into the wall stud 114 as shown in FIG. 14 to attach the nail plates to the wall stud 114. A wall surface can then be applied over the nail plates and the wall stud.

In the embodiment of FIGS. 8-14, the ends of the nail plates have dovetailed shape which defines at least one recess and at least one protruding portion or tab to mate with each other. In other embodiments, the recessed portions at the ends of the body can have straight side edges with a size and dimension to mate with an adjacent nail plate. The ends of the nail plates can have notched portions or recessed portions with other shapes that enable the ends of the nail plates to mate with each other without openings between the adjacent nail plates that would allow fasteners to pass between the plates.

While several embodiments have been disclosed and described it, will be understood that various changes and modifications can be made without departing from the spirit and scope of the invention as defined in the appended claims.

What is claimed is:

1. A gangable nail plate for protecting a utility line within a wall stud, said nail plate comprising:
a substantially flat planar body member having a thickness to resist penetration by a fastener, said body having a substantially rectangular shape with first and second longitudinal side edges, a first end edge transverse to said longitudinal side edges and having a dovetail shape with a first recessed portion, and a second end edge having a dovetail shaped recess with a dimension corresponding to said dovetail first end edge;
a first and second bendable nail tab having a leg with a first end coupled to said body member by a fold line and a nailing prong extending from a second end of said leg, said nail tab being bendable from a retracted position to an extended position for penetrating the wall stud, said second end edge further having a first tab in said dovetail shaped recess configured to mate with said first recessed portion of an adjacent nail plate with no openings or gaps in the nail plates or between the adjacent end edges of the adjacent nail plate ganged in an end to end configuration when the nail tabs are in the extended position penetrating the wall stud, and where said first bendable nail tab is positioned in said first recessed portion of said first end edge and said second bendable nail tab is positioned in said dovetail shaped recess.

2. The nail plate of claim 1, wherein
each said bendable nail tab has a longitudinal dimension extending from said transverse end edge in a longitudinal direction with respect to a longitudinal dimension of said body.

3. The nail plate of claim 2, wherein
said first end edge has a shape and dimension for mating and interlocking with said dovetail shaped recess of said second end edge of the adjacent nail plate.

4. The nail plate of claim 1, wherein
said first end edge and said dovetail shaped recess in said second end edge are longitudinally aligned with respect to each other.

5. A gangable nail plate for protecting a utility within a wall stud, comprising;
a body having a thickness to prevent penetration by a fastener, said body having a substantially rectangular configuration with first and second longitudinal side edges and first and second transverse ends, said first transverse end having a first end portion at said first longitudinal side edge and a first recess at said second longitudinal side edge, and said second transverse side having a second end portion at said second longitudinal side edge and a second recess at said first longitudinal side edge;
a first bendable nail tab at said first transverse end positioned in said first recess adapted for penetrating the wall stud and having a leg with a first end coupled to an inner edge of said first end portion by a fold line and extending from said first end portion toward said second side edge, said leg of said first nail tab being bendable from a retracted position to an extended position to penetrate the wall studs; and
a second bendable nail tab at said second transverse end positioned in said second recess and being bendable from a retracted position to an extended position for penetrating the wall stud at said second transverse end, said second bendable nail tab having a leg with a first end coupled to an inner edge of said second end portion by a second fold line and extending from said first end portion toward said second side edge, said first and second nail tabs, said first and second end portions and first and second recesses being configured to mate with an adjacent nail plate when a plurality of nail plates are ganged together with no gaps or openings in the nail plates or between the adjacent transverse ends.

6. The nail plate of claim 5, wherein
each of said nail tabs have a second leg extending from said first leg, said first legs having a length to extend about one half the width of said body.

7. The nail plate of claim 5, wherein
each said recess has a dimension to receive an end portion and nail tab of a second nail plate ganged together.

8. A gangable nail plate assembly for protecting a utility in a wall stud comprising a first nail plate and a second nail plate, each said nail plate having a thickness to prevent penetration by a fastener end comprising:
a body having a substantially rectangular shape with first and second longitudinal side edge and first and second transverse ends, said first transverse end having a first recess and said second transverse end having a first recess;
a first bendable nail tab bendable from a retracted position to an extended position for penetrating the wall stud, said first nail tab formed in said first recess of said first transverse end and extending in a longitudinal direction;
a second bendable nail tab bendable between a retracted position and an extended position for penetrating the wall stud, said second nail tab formed bar said first recess of said second transverse end and extending in a direction opposite to said first nail tab, and said first transverse end having a shape with a dimension for mating with said first recess of said second transverse end, and said second transverse end has a first protruding tab with a dimension for mating with a first recess of said first transverse end of an adjacent nail plate for coupling adjacent transverse ends said first and second nail plates together with no gaps or openings in the nail plates or between the adjacent transverse ends.

9. The nail plate of claim 8, wherein
said first tab of said second transverse end is positioned adjacent said second nail tab and aligned with said first recess of said first transverse end with respect to a longitudinal dimension of said body.

10. The nail plate of claim 8, wherein
said first transverse end includes a first tab and a second tab, and where said first recess of said first transverse end is formed between said first tab and second tab; and
said first recess of said second transverse end is configured to mate with said first tab and second tab of said first transverse end.

11. The nail tab of claim 10, wherein
said first and second tabs of said first transverse end define a dovetail and said recess in said second transverse end define a dovetail shaped recess.

12. The nail plate of claim 1, wherein
said nailing prong of said nail tab has a pointed end.

13. The nail plate of claim 6, wherein
said second leg of said first nail tab has a pointed end to penetrate the wall stud; and
said second leg of said second nail tab has a pointed end to penetrate the wall stud.

14. The nail plate of claim 8, wherein
each of said bendable nail tabs include a first leg integrally formed with said body and bendable from a first position extending at an incline with respect to a plane of said body and a second position lying in the plane of said body, and a second leg extending from said first leg for penetrating the wall stud.

15. The nail plate of claim 14, wherein
said first transverse end and said first recess of said second transverse end have a dovetail shape to interlock said nail plates together.

16. A gangable nail plate assembly for protecting a utility line within a wall stud comprising a first nail plate and a second nail plate, each said nail plate comprising:
   a substantially flat planar body member having a thickness to resist penetration by a fastener, said body having a substantially rectangular shape with a first longitudinal side, a second longitudinal side, a first transverse end with a first recess and a second transverse end with a second recess;
   a first bendable nail tab positioned in said first recess and being bendable from a retracted position to an extended position for penetrating the wall stud, and having a longitudinal dimension with a leg having a first end coupled to said body by a fold line at said first longitudinal side and extending toward and spaced from said second longitudinal side to form said first recess at said second longitudinal side and said first transverse end,
   a second bendable nail tab positioned in said second recess and being bendable from a retracted position to an extended position for penetrating the wall stud, and having a longitudinal dimension with a leg having a first end coupled to said body by a fold line at said second longitudinal side and extending toward and spaced from said first longitudinal side to form said second recess at said second longitudinal side and said second transverse end, said first bendable nail tab being aligned longitudinally with said second recess and said second bendable nail tab being aligned longitudinally with said first recess,
   said first bendable nail tab of said first nail plate having a dimension to mate with the second recess of said second nail plate ganged together in an end to end configuration with no openings or gaps between the mating transverse ends of the ganged nail plates.

17. The ganged nail plate assembly of claim 16, wherein
each of said bendable nail tabs have a second leg for penetrating the wall stud, said second leg being coupled to said respective first leg.

18. The ganged nail plate assembly of claim 16, each said nail plate further comprising
   a first end portion extending from said first transverse end at said first longitudinal side and having an inner edge facing said second longitudinal side, said first bendable nail tab extending from said inner edge of said first end portion toward said second longitudinal side, whereby said first recess has an open side at said second longitudinal side and an open side at said first transverse end; and
   a second end portion extending from said second transverse end at said second longitudinal side and having an inner edge facing said second longitudinal side, said second bendable nail tab extending from said inner edge of said second end portion toward said first longitudinal side, whereby said second recess has an open side at said first longitudinal side and an open side at said second transverse end.

\* \* \* \* \*